United States Patent [19]

Stehr

[11] Patent Number: 5,494,425
[45] Date of Patent: Feb. 27, 1996

[54] PROCESS AND ARRANGEMENT INCLUDING A GEAR PUMP FOR HANDLING THERMOPLASTIC LIQUIFIED MATERIAL

[75] Inventor: Roger Stehr, Bülach, Switzerland

[73] Assignee: Maag Pump Systems AG, Switzerland

[21] Appl. No.: 141,765

[22] Filed: Oct. 27, 1993

[30] Foreign Application Priority Data

Oct. 28, 1992 [CH] Switzerland ........................ 03360/92
Apr. 19, 1993 [CH] Switzerland ........................ 1179/93

[51] Int. Cl.⁶ ............................................. F01C 21/04
[52] U.S. Cl. .................... 418/83; 418/102; 418/206; 417/201; 95/266; 96/194
[58] Field of Search .................. 418/83, 102, 206; 417/201, 205; 95/266, 260; 96/193, 194

[56] References Cited

U.S. PATENT DOCUMENTS

| | | | |
|---|---|---|---|
| 3,746,481 | 7/1973 | Schippers | 418/83 |
| 3,817,668 | 6/1974 | Mayer et al. | 418/206 |
| 3,837,768 | 9/1974 | Haupt | 418/206 |
| 4,336,213 | 6/1982 | Fox | 418/102 |
| 4,711,647 | 12/1987 | Gathmann | 96/194 |
| 4,725,211 | 2/1988 | Gray | 418/102 |
| 5,174,725 | 12/1992 | Guile et al. | 417/205 |

FOREIGN PATENT DOCUMENTS

| | | |
|---|---|---|
| 0189670 | 8/1986 | European Pat. Off. . |
| 0200152 | 11/1986 | European Pat. Off. . |
| 1935203 | 8/1970 | Germany . |
| 3133647 | 3/1983 | Germany . |
| 3529528 | 2/1987 | Germany . |
| 4125128 | 2/1992 | Germany . |
| 573053 | 2/1976 | Switzerland . |

*Primary Examiner*—Charles Freay
*Attorney, Agent, or Firm*—Evenson, McKeown, Edwards & Lenahan

[57] ABSTRACT

Apparatus and process for handling thermoplastic liquified material is disclosed. A system including an extruder feeding into a degasifying chamber is disposed upstream of a gear pump for pressurizing the material. The extruder gravity delivering, by way of a multiple-billet die, billets to the gears outside of the gear meshing area.

10 Claims, 3 Drawing Sheets

5,494,425

PROCESS AND ARRANGEMENT INCLUDING A GEAR PUMP FOR HANDLING THERMOPLASTIC LIQUIFIED MATERIAL

BACKGROUND AND SUMMARY OF THE INVENTION

Extruder types are known which, because of their type of construction, do not permit the degasifying of a liquified material along the extrusion unit. An important representative of this extruder type is the so-called "planetary roller extruder", as known, for example, from German Patent Document DE-PS 31 33 647. In the case of these extruders, a degasifying of the delivered medium can take place only after it leaves the extrusion unit.

Although conventional degasifying extruders have one or several degasifying openings-in the cylinder, the effectiveness of the degasifying of the liquified material is limited considerably because of the small achievable surface of the liquified material.

In order to meet the requirement of an intensive degasifying of the liquified material, two-stage extrusion systems of a cascade construction were suggested, in which case a degasifying shaft was inserted between the extrusion stages and a vacuum pump was connected.

Cascade systems of this type have the disadvantage of a large processing length which requires correspondingly high expenditures for the thermal stabilization of the delivered medium. In addition, a large processing length requires the corresponding space as well as large amounts of driving and heating energy.

From U.S. Pat. No. 3,817,668, it is known to deliver by means of a gear pump predominantly low-viscous thermoplastic polymer liquified material from a receptacle which is subjected to a vacuum with respect to the ambient pressure, for example, from a reactor bulb.

Because of their constructive design and the limited usage spectrum (viscosity), these pumps, which have been known from the synthesis of polymers, were rarely used in the extrusion of plastics.

Within the scope of an increasing environmental awareness, there is now, on the one hand, a growing requirement for recycling post consumer plastic waste; on the other hand, an increasing amount of thermally sensitive thermoplastic material and particularly PVC-materials are to be processed.

The present invention relates to the processing of thermoplastic post consumer waste and of PVC.

Within the scope of a first aspect, the invention has the object of further developing a process or a treatment stage of the above-noted type in such a manner that it can be used for thermoplastic post consumer wastes or for PVC.

In the case of a process of the above-noted type, this is achieved according to certain preferred embodiments of the invention by providing an arrangement including a gear pump fed by at least one billet-like shape of the material of a given geometry. In especially advantageous contemplated embodiments of the invention a treatment stage is provided with a degasifying shaft which is subjected to a vacuum and with a gear pump for the build-up of the delivery pressure of the material, which gear pump is connected behind the degasifying shaft and can be charged with a vacuum with respect to the ambient pressure, wherein the gear pump is fed by means of a multiple extrusion die for treatment of PVC or of thermoplastic plastic wastes of a varying composition, which are contaminated to a varying degree.

A reason that the invention is advantageous is that it was found that, for the processing according to the invention, on the one hand, of thermoplastic post consumer wastes, their composition can be varied within a very wide range and they may be contaminated to different degrees; and, on the other hand, for the processing of PVC, the feeding is required of the provided gear pumps by means of a billet of the material of a given geometry, preferably by means of a multiple billet. When processing PVC, a delivery of the gear pump that is free of disturbances will exist only when a constant given geometry of the billet is ensured.

In the case of the above-mentioned wastes, solvent portions of printing dyes and residual moisture portions of any type must be removed in order to obtain qualitatively useful secondary products.

In order to therefore utilize for the degasifying an achievable surface of the material that is as large as possible, it is suggested according to preferred embodiments of the invention to form the above-mentioned billet-like shape or preferably the multiple billet before the degasifying and to therefore guide it through the degasifying shaft to the inlet of the provided gear pump.

For the intensive degasifying of the material, a surface of the material is required which is as large as possible relative to the volume of the same.

When the approach according to the present invention is used, it is easily possible for the material to be processed to keep the process length short compared with the cascade systems and to connect behind an extruder a degasifying shaft and to connect behind the latter a gear pump that can be charged from a vacuum.

From Swiss Patent Document CH-PS-573 053 and U.S. Pat. No. Document U.S. Pat. No. 3,746,481, gear pumps are known which are designed for being charged with a vacuum with respect to ambient pressure. These pumps therefore make it possible to be operated in a completely filled manner even when charged from the vacuum and to thus furnish the constant delivery pressure which is typical of gear pumps. However, these pumps are not suitable for the delivery of very contaminated thermoplastic material, particularly on the basis of rotor shaft seals, normally by means of axial face seals or gland packings.

Under another aspect, the present invention therefore has the object of further developing a pump of the latter type, that is, a pump which is suitable for the delivery of highly viscous media, such as plastic liquified material in general, specifically from a vacuum with respect to ambient pressure, and which has a charging hopper which is situated above the gearwheels and tapers toward the gearwheels, in such a manner that this pump can be used for the delivery of the above-mentioned contaminated thermoplastic material of a varying composition, and also for the delivery of PVC.

This object is achieved according to preferred embodiments by providing at treatment stage, a treatment stage for thermoplastic material with a degasifying shaft which is subjected to a vacuum and with a gear pump for the build-up of the delivery pressure of the material, which gear pump is connected behind the degasifying shaft and can be charged with a vacuum with respect to the ambient pressure, wherein the gear pump is fed by means of a multiple extrusion die for treatment of PVC or of thermoplastic plastic wastes of a varying composition, which are contaminated to a varying degree It is known from European Patent Document EP-A-0 189 670 how a gear pump is to be designed for the delivery of thermally sensitive polymers, such as PVC; that is, in such a manner that the delivered medium forms the lubricating medium for the shaft bearings, and flow paths are provided for the delivered medium axially along the rotor shaft into the environment. However, the gear pump described there is not capable of delivering from a vacuum, thus from pressure conditions which make the advancing of the delivered medium as the lubricating medium seem difficult.

It is now recognized according to the invention that the gear pump which is known in principle from the Swiss Patent Document CH-PS-573 053, and which is normally used for the delivery of thinly to medium-viscous media from a reactor bulb under a vacuum, will also be easily suitable for the delivery of very contaminated thermoplastic material when its rotors, according to a gear pump normally used between the extruder and the extrusion tool, are disposed according to European Patent Document EP-A-0 189 670, although it is charged from a vacuum.

In the case of a preferred embodiment of the treatment stage according to the invention, the latter gear pump is used which is also inventive.

Other objects, advantages and novel features of the present invention will become apparent from the following detailed description of the invention when considered in conjunction with the accompanying drawings.

DETAILED DESCRIPTION OF THE DRAWINGS

Figure 1:
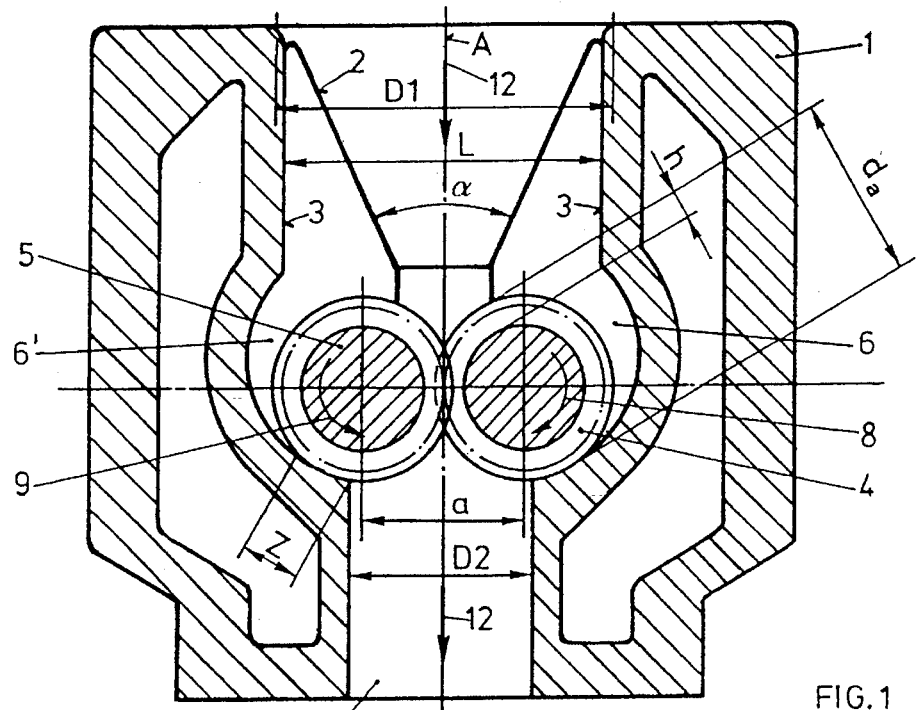
FIG. 1 is a longitudinal sectional view of a gear pump according to the invention.

According to FIG. 1, a pump according to the invention has a housing 1 into which a charging hopper 2 is integrated which is situated above the gearwheels 4 and 5 of the pump.

Preferably, the charging hopper 2 has a cone opening angle $\alpha$ between 36° and 60°. Recesses 3 are machined into the hopper 2 which are situated opposite one another and which, viewed from above, jointly set a rectangular cross-section. In this case, the distance B (FIG. 2) between the two lateral walls of the recesses 3, which extend in parallel to the faces of the gearwheels 4 and 5 and of the hopper axis A, is approximately equal to the width b (FIG. 2) of the gearwheels. The distance L between the lateral walls of the two recesses 3, which are preferably provided, the lateral walls extending in parallel to the gearwheel axes C and to the hopper axis A, is approximately equal to the sum of the outer gearwheel diameters $d_a$ minus a tooth height h.

Following the respective rectangular recesses 3, that is, following their lower ends facing the gearwheels, a crescent-shaped recess 6, 6' is situated which forms the compression zone for the delivered medium fed to the charging hopper 2—the thermoplastic liquified material. The largest radial distance from the tip surface cylinder of the respective gearwheel corresponds at least to the tooth height h. The subsequent sealing zone Z has the minimal length of a tooth pitch of the gearwheels 4 and 5 and forms a narrow gap with the tip surface cylinder of the assigned gearwheel.

When a shaft 7 is driven in the direction of the arrow 8, the gearwheel 4 rotates in the same rotating direction and the gearwheel 5 therefore rotates in the opposite rotating direction 9. As a result, the medium to be delivered is taken along in the direction of the arrow 12 and enters into the tooth spaces of the gearwheels 4 and 5; is compressed in the compression zone, and is then pressed completely into the tooth spaces. Then, it is discharged through an outlet opening 11.

Advantageously, the largest diameter D1 of the charging hopper 2 is selected between the 2.1-fold and 2.3-fold center distance a of the gearwheels 4 and 5. The diameter D2 of the outlet opening 11 is advantageously selected essentially as half of the largest diameter D1 of the charging hopper 2.

Figure 2:
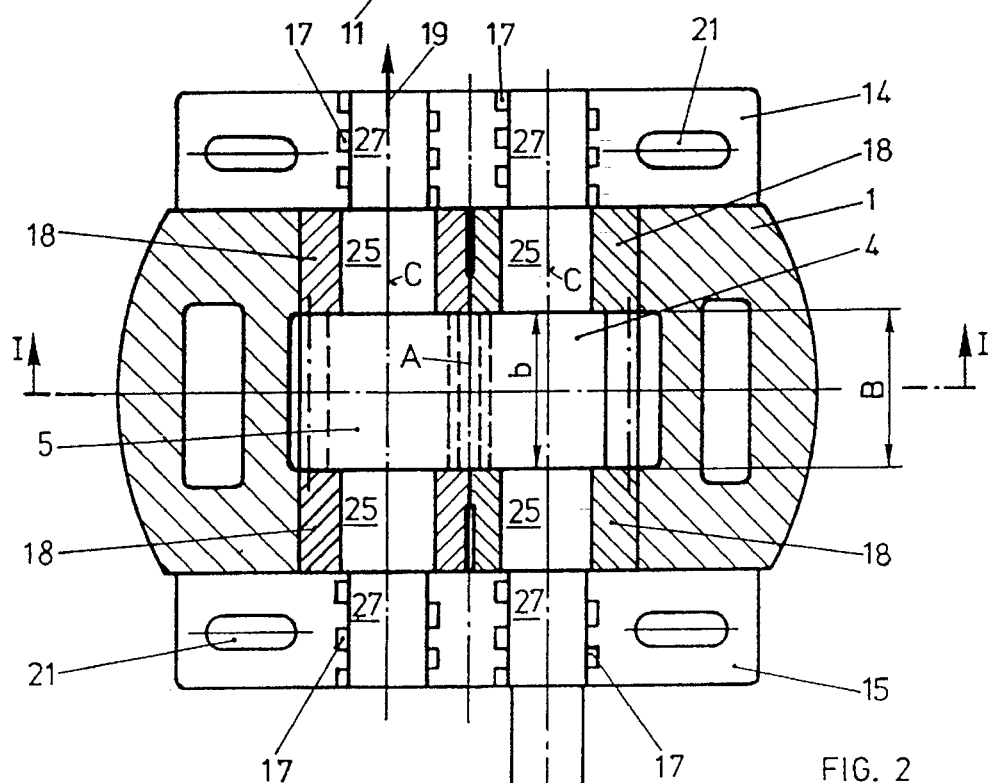
FIG. 2 is a cross-sectional view of the gear pump according to FIG. 1.

FIG. 2 illustrates that the rotor shafts are disposed on the respective gearwheels 4 and 5 by means of shaft bearing sections 25 in slide bearings 18 and extend, by means of extension pins 27 further to the outside and lead through the respective pump cover 14 or 15 to the outside into the environment. In the pump covers 15 and 14, the extension pins 27 extend in labyrinth seals 17 which are formed by screw-shaped grooves in the shaft journals 27 and/or in the pump covers 15 and 14.

The preferred delivery direction of the labyrinth seals 17 is indicated by the arrow 19 in FIG. 2.

A small portion (‰) of the contaminated thermoplastic material fed through the charging hopper 2 is pressed as the lubricating medium axially in the direction 19 through the slide bearings 18 and is finally discharged to the environment by the delivery effect of the labyrinth seals as waste. In the housing 1 as well as in the pump covers 14 and 15, the ducts 21 are provided for a cooling medium.

By means of this pump, very contaminated thermoplastic material including PVC-material can be discharged from the discharge opening 11 starting at a vacuum present in the charging hopper 2 with respect to the ambient pressure by means of a constant delivery pressure which is customary for gear pumps.

The provided slide bearings with the labyrinth seals situated on the outside and the lead-out of the shaft journals into the environment make it possible to lubricate the bearings by means of the delivered medium and in the process to discharge the delivered-medium flow, which is branched off as the lubricating flow, as waste to the outside.

Figure 3:
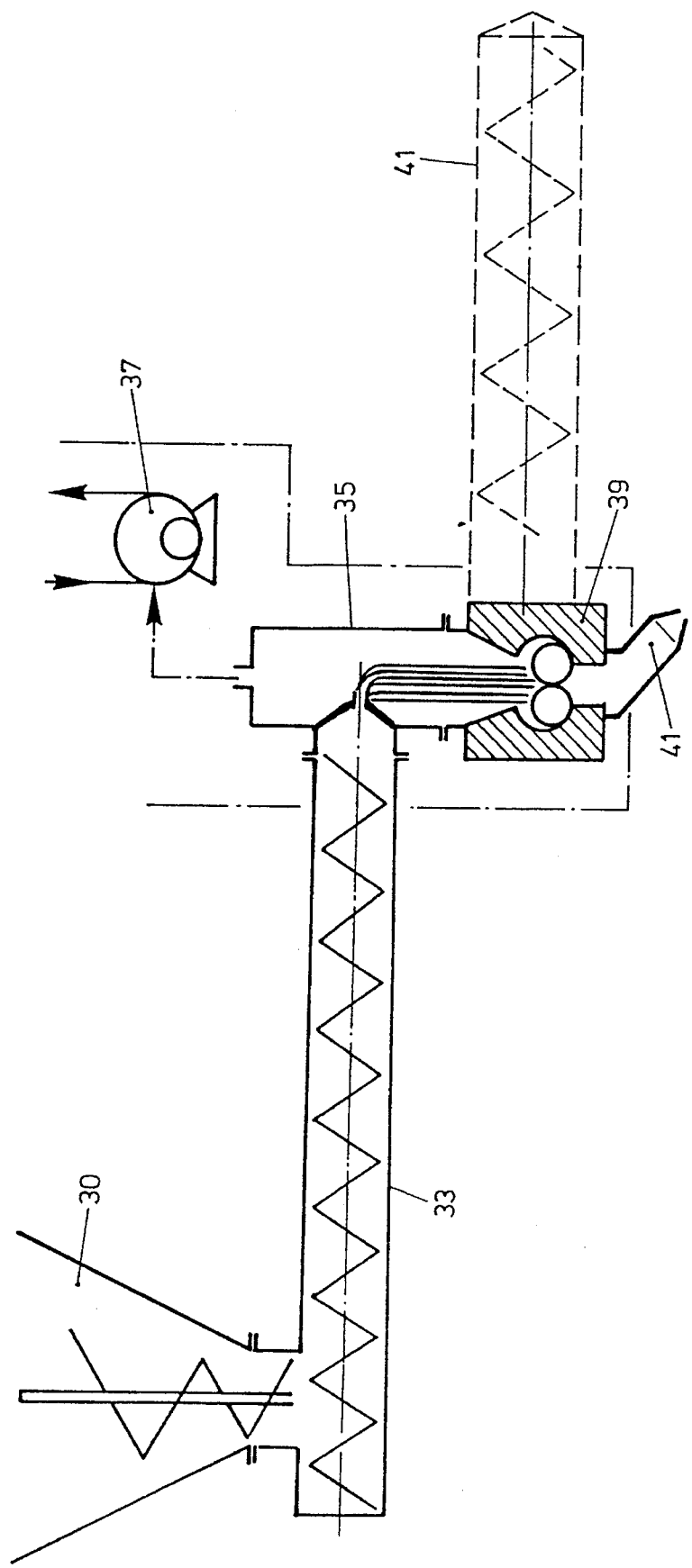
FIG. 3 is a schematic view of a system for the production of a thermoplastic mixture with the treatment stage according to the invention.

FIG. 3 schematically illustrates an extrusion system according to the invention with a treatment stage according to the invention which is surrounded by a dash-dotted line. As an example, the extrusion system in this case comprises a packing device 30 and, connected behind it, an arbitrarily constructed one- or multi-screw extruder 33 leading out, by way of a multiple-billet die 31, into the degasifying shaft 35 of the treatment stage according to the invention. The multiple-billet die 31 gravity delivering the billets of the material uniformly onto the two gears outside of the meshing of the gears, as shown in FIG. 3. If required, one or several filters for the material may, in addition, be installed between the extruder 33 and the degasifying shaft 35. The degasifying of the very contaminated thermoplastic material or PVC-material produced in the extruder 33 takes place in the degasifying shaft 35 by means of the vacuum pump 37. The degasifying shaft 35 which, as a result, is subjected to a vacuum with respect to the ambient pressure, leads into the charging opening of a gear pump 39 which is constructed such that, in the case of a charge-side vacuum, it delivers on the outlet side the constant delivery pressure which is customary for gear pumps. It leads out, for example, into an extrusion tool 41.

As demonstrated, by providing the delivery gear pump 39, which is constructed as specified, the processing length of the extrusion system is reduced considerably in comparison to conventional cascade systems by means of the degasifying shaft 35 and the second extrusion stage 40 (indicated by an interrupted line) connected behind it. As a result of the providing of the die 31, this treatment of plastic wastes of the above-mentioned type or of PVC-meltings can be reproduced and therefore become commercially possible.

The pump which was described in principle by means of FIGS. 1 and 2 will preferably be used as the delivery pump 39.

Figure 4:
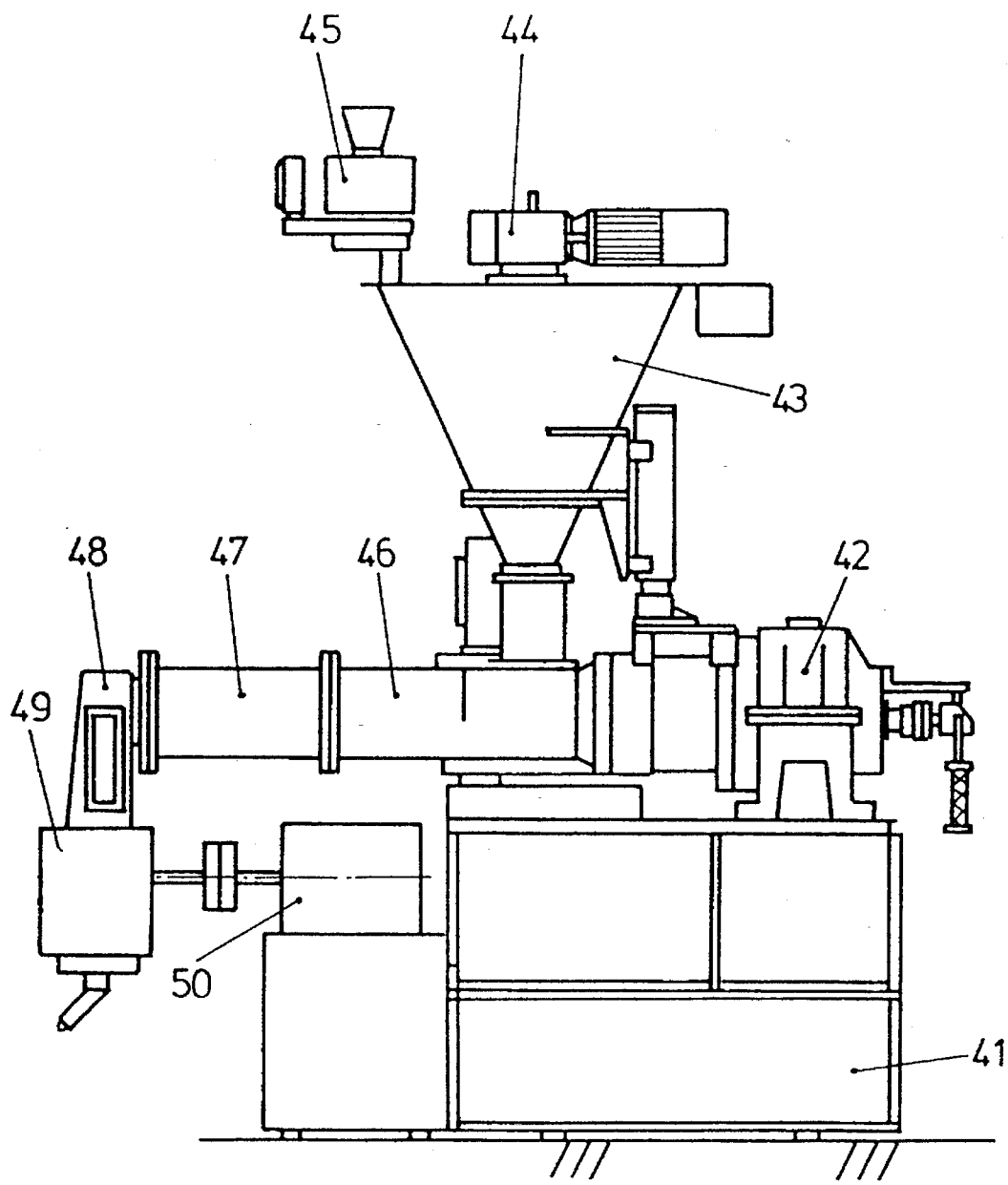
FIG. 4 is a schematic view of an extrusion system according to the invention with the treatment stage according to the invention.

FIG. 4 schematically illustrates a currently preferred extrusion system according to the invention with the treatment stage according to the invention and the delivery pump according to the invention. The illustrated extrusion system comprises a machine frame 41 and a system 42 for driving the extruder. An extrusion part 46 leads from the system 42, and an extrusion die 47 is arranged between the part 46 and the degasifying shaft 48 connected above the delivery gear pump 49 which is driven by a conventional drive 50. Other known features of the system include a packing device 43 which is driven by a motor 44, and a metal extractor 45.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for handling of a thermoplastic material of uncontrolled varying composition, comprising the steps of degasifying the material by freely exposing the material to a vacuum, and subsequently building up delivery pressure for delivery of the material via a gear pump having two gears meshing in a meshing area by gravity delivering billets of the material uniformly onto the two gears outside the meshing area.

2. A process according to claim 1, wherein the billets are shaded before the degasifying step.

3. A process according to claim 1, wherein the thermoplastic material includes PVC.

4. A method for recycling thermoplastic wastes of uncontrolled varying composition and contamination content, comprising the steps of (a) extruding the thermoplastic wastes as billets into an evacuated degasing, stage, (b) leading the billets along a predetermined length freely exposed for degasing through the degasing stage and gravity delivering the billets into a gear pump having two gears meshing in a meshing area such that the billets are uniformly delivered onto the two gears outside the meshing area, and (c) feeding the wastes by the gear pump to a forming tool.

5. The method according to claim 4, wherein said thermoplastic wastes include PVC.

6. The method according to claim 4, further comprising the step of lubricating gear wheel rotors of the gear pump with a portion of said thermoplastic waste material conveyed from said degasing stage to said forming tool.

7. Apparatus for treating thermoplastic material of uncontrolled varying composition, comprising a degasifying shaft which is subjected to a vacuum, a gear pump for the build-up of the delivery pressure of the material, and connected downstream of the degasifying shaft so as to be chargeable with a vacuum with respect to the ambient pressure, wherein the gear pump has two gears meshing in a meshing area, and means for gravity delivering billets of the material uniformly onto the two gears outside the meshing area.

8. Apparatus according to claim 7, wherein the gear pump has an inlet hopper which is situated above the gears and tapers toward the gears, wherein, for the delivery of the material, shafts of the gears are disposed such that the delivered material forms the lubricating medium for bearings of the shafts, and flow paths for the delivered material are provided axially along the shafts into the environment.

9. Apparatus according to claim 8, wherein the hopper is provided with a cone angle of between 36° and 60°and a recess of rectangular cross-section, a distance between lateral walls of the recess, which extend parallel to faces of the gears and a hopper axis, being approximately equal to width of the gears, and a distance between lateral walls which extend parallel to rotational axes of the gears and to the hopper axis, is substantially equal to a sum of diameters of the gears minus a tooth height.

10. Apparatus according to claim 8, wherein the largest diameter of the hopper is equal to 2.1 to 2.3 times the center distance (a) of the gears.

* * * * *